(12) United States Patent  (10) Patent No.: US 7,483,044 B2
Damera-Venkata  (45) Date of Patent: Jan. 27, 2009

(54) DISPLAYING SUB-FRAMES AT SPATIALLY OFFSET POSITIONS ON A CIRCLE

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 748 days.

(21) Appl. No.: 10/768,215

(22) Filed: Jan. 30, 2004

(65) Prior Publication Data

US 2005/0168493 A1 Aug. 4, 2005

(51) Int. Cl.
*G09G 5/02* (2006.01)
(52) U.S. Cl. .................. 345/694; 345/696; 345/698
(58) Field of Classification Search ................ 345/15, 345/24, 442, 475, 32, 690–699; 708/275; 348/625; 353/46
See application file for complete search history.

(56) References Cited

U.S. PATENT DOCUMENTS

| | | | |
|---|---|---|---|
| 4,228,432 A * | 10/1980 | Osborne | ................ 345/13 |
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,317,409 A | 5/1994 | Macocs | |
| 5,386,253 A | 1/1995 | Fielding | |
| 5,490,009 A | 2/1996 | Venkateswar et al. | |
| 5,557,353 A | 9/1996 | Stahl | |
| 5,689,283 A | 11/1997 | Shirochi | |
| 5,842,762 A | 12/1998 | Clarke | |
| 5,897,191 A | 4/1999 | Clarke | |
| 5,912,773 A | 6/1999 | Barnett et al. | |
| 5,920,365 A | 7/1999 | Eriksson | |
| 5,953,148 A | 9/1999 | Moseley et al. | |
| 5,978,518 A | 11/1999 | Oliyide et al. | |
| 6,025,951 A | 2/2000 | Swart et al. | |
| 6,067,143 A | 5/2000 | Tomita | |
| 6,104,375 A | 8/2000 | Lam | |
| 6,118,584 A | 9/2000 | Van Berkel et al. | |
| 6,141,039 A | 10/2000 | Poetsch | |
| 6,184,969 B1 | 2/2001 | Fergason | |
| 6,219,017 B1 | 4/2001 | Shimada et al. | |
| 6,239,783 B1 | 5/2001 | Hill et al. | |
| 6,243,055 B1 | 6/2001 | Fergason | |
| 6,313,888 B1 | 11/2001 | Tabata | |

(Continued)

FOREIGN PATENT DOCUMENTS

EP 1001306 A2 5/2000

(Continued)

OTHER PUBLICATIONS

L.M. Chen and S. Hasagawa, "Visual Resolution Limits for Color Matrix Displays", Displays, Technologies, and Applications, vol. 13, pp. 221-226, 1992.

(Continued)

*Primary Examiner*—Kevin M Nguyen

(57) ABSTRACT

A method of displaying an image with a display device includes receiving image data for the image. The method includes generating a plurality of sub-frames corresponding to the image data. The method includes displaying the sub-frames at a set of spatially offset positions located on a circle.

30 Claims, 10 Drawing Sheets

U.S. PATENT DOCUMENTS

| | | | |
|---|---|---|---|
| 6,384,816 B1 | 5/2002 | Tabata | |
| 6,393,145 B2 | 5/2002 | Betrisey et al. | |
| 6,456,340 B1 | 9/2002 | Margulis | |
| 6,522,356 B1 | 2/2003 | Watanabe | |
| 6,657,603 B1 * | 12/2003 | Demetrescu et al. | 345/32 |
| 6,775,420 B2 * | 8/2004 | Daly | 345/87 |
| 6,909,441 B2 * | 6/2005 | Hashimoto | 345/690 |
| 7,091,986 B2 * | 8/2006 | Phan | 345/694 |
| 2003/0020809 A1 | 1/2003 | Gibbon et al. | |
| 2003/0076325 A1 | 4/2003 | Thrasher | |
| 2003/0090597 A1 | 5/2003 | Katoh et al. | |

OTHER PUBLICATIONS

A. Yasuda et al., "FLC Wobbling for High-Resolution Projectors", Journal of the SID May 3, 1997, pp. 299-305.

T. Tokita et al., "P-108: FLC Resolution-Enhancing Device for Projection Displays", SID 02 Digest 2002, pp. 6388-641.

L.M. Chen "One-Panel Projectors", pp. 221-226. Date unknown.

Candice H. Brown Elliot et al., "Color Subpixel Rendering Projectors and Flat Panel Displays"; SMPTE Advanced Motion Imaging Conference; Feb. 27-Mar. 1, 2003; pp. 1-4.

D.H. Kelly, "Motion and Vision—II. Stabilized Spatio-Temporal Threshold Surface," Journal of the Optical Society of America, vol. 69, No. 10, Oct. 1979.

Molina, R., et al.: "Parameter Estimation in Bayesian High-Resolution . . . " IEEE Transactions on Image; Dec. 2003; pp. 1655-1667; vol. 12; USA; XP-002334255.

Jaynes, C. et al.: "Super-Resolution Composition in Multi-Projector Displays"; IEEE Intern. Conference; Oct. 2003; 8 pages; Sections 3.2, 3.3; XP-002308199.

Park, Sung, et al.: "Super-Resolution Image Reconstruction . . . "; IEEE Signal Processing Magazine: May 2003; pp. 21-36; vol. 20; USA; XP-002333377.

* cited by examiner

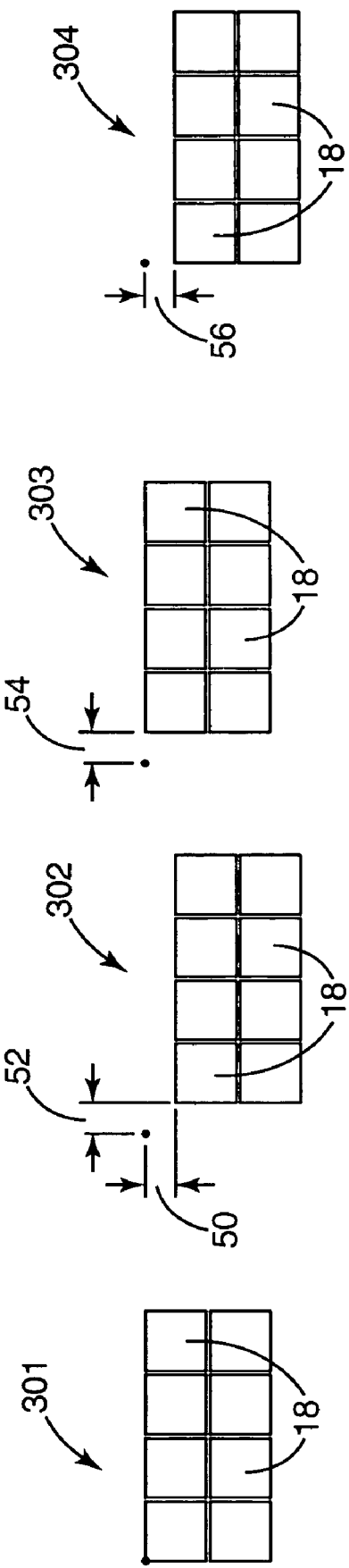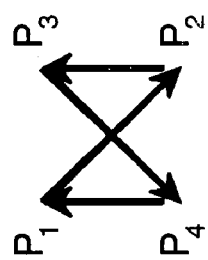

DISPLAYING SUB-FRAMES AT SPATIALLY OFFSET POSITIONS ON A CIRCLE

CROSS-REFERENCE TO RELATED APPLICATIONS

This application is related to U.S. patent application Ser. No. 10/213,555, filed on Aug. 7, 2002, entitled IMAGE DISPLAY SYSTEM AND METHOD; U.S. patent application Ser. No. 10/242,195, filed on Sep. 11, 2002, entitled IMAGE DISPLAY SYSTEM AND METHOD; U.S. patent application Ser. No. 10/242,545, filed on Sep. 11, 2002, entitled IMAGE DISPLAY SYSTEM AND METHOD; U.S. patent application Ser. No. 10/631,681, filed Jul. 31, 2003, entitled GENERATING AND DISPLAYING SPATIALLY OFFSET SUB-FRAMES; U.S. patent application Ser. No. 10/632,042, filed Jul. 31, 2003, entitled GENERATING AND DISPLAYING SPATIALLY OFFSET SUB-FRAMES; U.S. patent application Ser. No. 10/672,845, filed Sep. 26, 2003, entitled GENERATING AND DISPLAYING SPATIALLY OFFSET SUB-FRAMES; U.S. patent application Ser. No. 10/672,544, filed Sep. 26, 2003, entitled GENERATING AND DISPLAYING SPATIALLY OFFSET SUB-FRAMES; U.S. patent application Ser. No. 10/697,605, filed Oct. 30, 2003, and entitled GENERATING AND DISPLAYING SPATIALLY OFFSET SUB-FRAMES ON A DIAMOND GRID; U.S. patent application Ser. No. 10/696,888, filed Oct. 30, 2003, and entitled GENERATING AND DISPLAYING SPATIALLY OFFSET SUB-FRAMES ON DIFFERENT TYPES OF GRIDS; U.S. patent application Ser. No. 10/697,830, filed Oct. 30, 2003, and entitled IMAGE DISPLAY SYSTEM AND METHOD; U.S. patent application Ser. No. 10/750,591, filed Dec. 31, 2003, entitled DISPLAYING SPATIALLY OFFSET SUB-FRAMES WITH A DISPLAY DEVICE HAVING A SET OF DEFECTIVE DISPLAY PIXELS; and U.S. patent application Ser. No. 10/768,621, filed on the same date as the present application, entitled GENERATING AND DISPLAYING SPATIALLY OFFSET SUB-FRAMES. Each of the above U.S. Patent Applications is assigned to the assignee of the present invention, and is hereby incorporated by reference herein.

THE FIELD OF THE INVENTION

The present invention generally relates to display systems, and more particularly to displaying sub-frames at spatially offset positions on a circle.

BACKGROUND OF THE INVENTION

A conventional system or device for displaying an image, such as a display, projector, or other imaging system, produces a displayed image by addressing an array of individual picture elements or pixels arranged in a pattern, such as in horizontal rows and vertical columns, a diamond grid, or other pattern. A resolution of the displayed image for a pattern with horizontal rows and vertical columns is defined as the number of horizontal rows and vertical columns of individual pixels forming the displayed image. The resolution of the displayed image is affected by a resolution of the display device itself as well as a resolution of the image data processed by the display device and used to produce the displayed image.

Typically, to increase a resolution of the displayed image, the resolution of the display device as well as the resolution of the image data used to produce the displayed image must be increased. Increasing a resolution of the display device, however, increases a cost and complexity of the display device. In addition, higher resolution image data may not be available or may be difficult to generate.

SUMMARY OF THE INVENTION

One form of the present invention provides a method of displaying an image with a display device. The method includes receiving image data for the image. The method includes generating a plurality of sub-frames corresponding to the image data. The method includes displaying the sub-frames at a set of spatially offset positions located on a circle.

BRIEF DESCRIPTION OF THE DRAWINGS

FIGS. 3A-3E are schematic diagrams illustrating the display of four sub-frames according to one embodiment of the present invention.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Spatial and Temporal Shifting of Sub-Frames

Some display systems, such as some digital light projectors, may not have sufficient resolution to display some high resolution images. Such systems can be configured to give the appearance to the human eye of higher resolution images by displaying spatially and temporally shifted lower resolution images. The lower resolution images are referred to as sub-frames. Appropriate values for the sub-frames are determined so that the displayed sub-frames are close in appearance to how the high-resolution image from which the sub-frames were derived would appear if directly displayed. One embodiment of a display system that provides the appearance of enhanced resolution through temporal and spatial shifting of sub-frames is described below with reference to FIGS. 1-4E.

Figure 1:
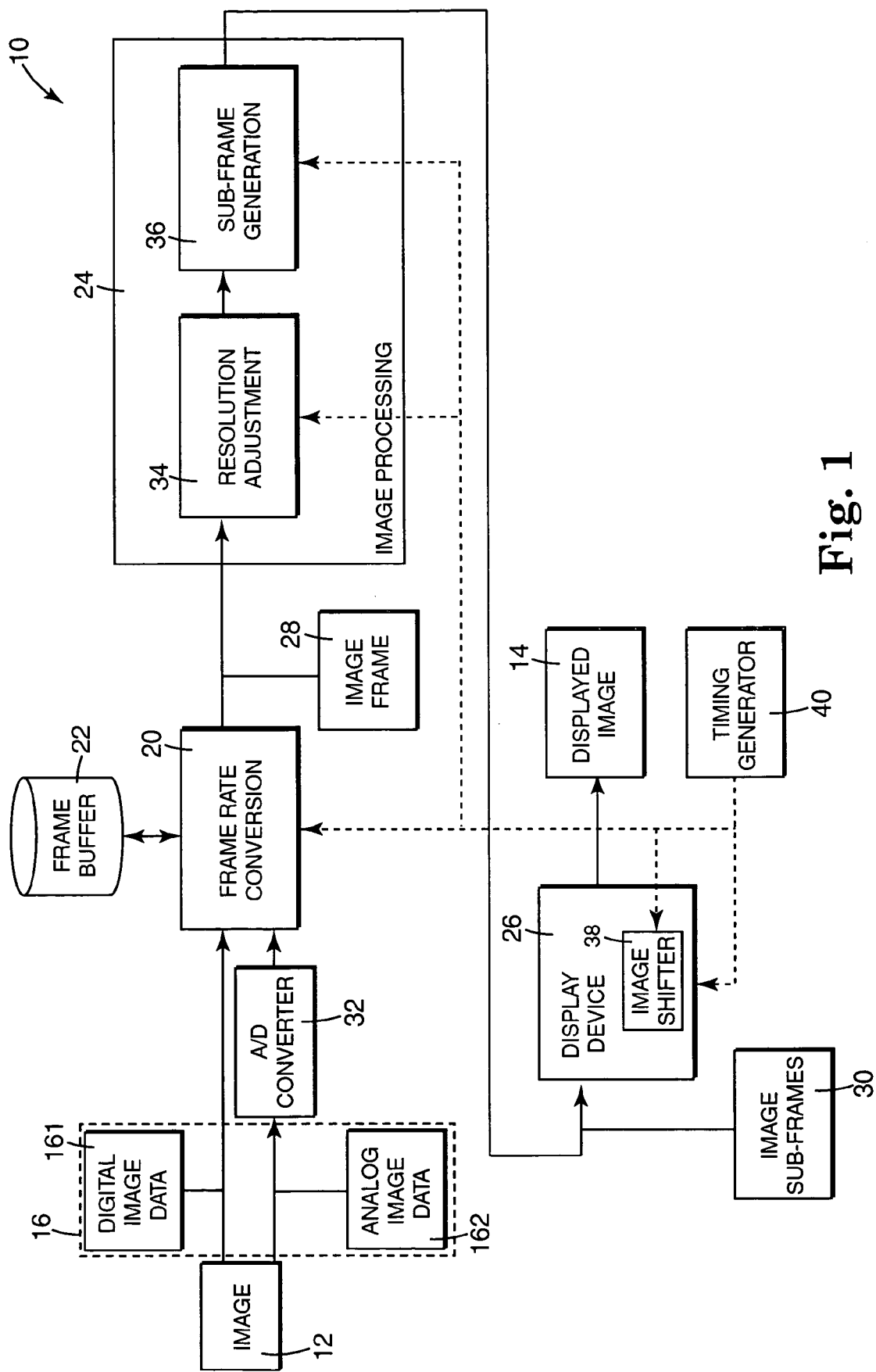
FIG. 1 is a block diagram illustrating an image display system according to one embodiment of the present invention.

FIG. 1 is a block diagram illustrating an image display system 10 according to one embodiment of the present invention. Image display system 10 facilitates processing of an image 12 to create a displayed image 14. Image 12 is defined to include any pictorial, graphical, or textural characters, symbols, illustrations, or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In one embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. Image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and image processing unit 24, includes hardware, software, firmware, or a combination of these. In one embodiment, one or more components of image display system 10, including frame rate conversion unit 20 and image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28, and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. In one embodiment, image frame 28 includes a plurality of columns and a plurality of rows of individual pixels on a rectangular grid representing image 12.

Frame rate conversion unit 20 and image frame buffer 22 can receive and process image data 16 as progressive image data or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In one embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to increase, decrease, or leave unaltered the resolution of image data 16. Accordingly, with image processing unit 24, image display system 10 can receive and display image data 16 of varying resolutions.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26.

Image sub-frames 30 are each of an area equal to image frame 28. In one embodiment, sub-frames 30 each include a plurality of columns and a plurality of rows of individual pixels on a rectangular grid representing a subset of image data 16 of image 12.

Image sub-frames 30 are spatially offset from each other when displayed. In one embodiment, image sub-frames 30 are offset from each other by a vertical distance and a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, display device 26 displays an entire sub-frame 30 for image frame 28 at one time.

In one embodiment, display device 26 performs one cycle of displaying image sub-frames 30 for each image frame 28. Display device 26 displays image sub-frames 30 so as to be spatially and temporally offset from each other. In one embodiment, display device 26 optically steers image sub-frames 30 to create displayed image 14. As such, individual pixels of display device 26 are addressed to multiple locations.

In one embodiment, display device 26 includes an image shifter 38. Image shifter 38 spatially alters or offsets the position of image sub-frames 30 as displayed by display device 26. More specifically, image shifter 38 varies the position of display of image sub-frames 30, as described below, to produce displayed image 14.

In one embodiment, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In one embodiment, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 and generate image sub-frames 30, and positioning and displaying of image sub-frames 30 to produce displayed image 14. Accordingly, timing generator 40 controls timing of image display system 10 such that entire sub-frames of image 12 are temporally and spatially displayed by display device 26 as displayed image 14.

Figure 2C:
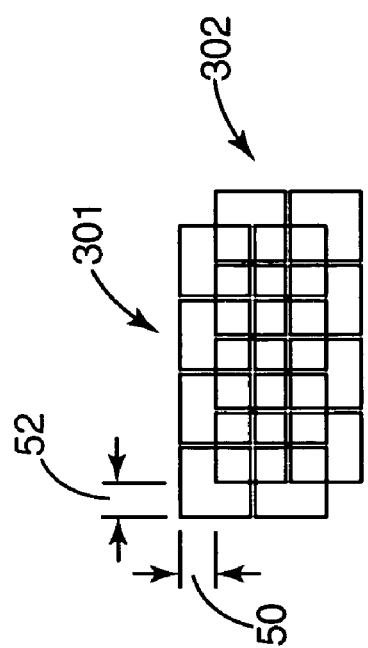
FIGS. 2A-2C are schematic diagrams illustrating the display of two sub-frames according to one embodiment of the present invention.
Figure 2B:
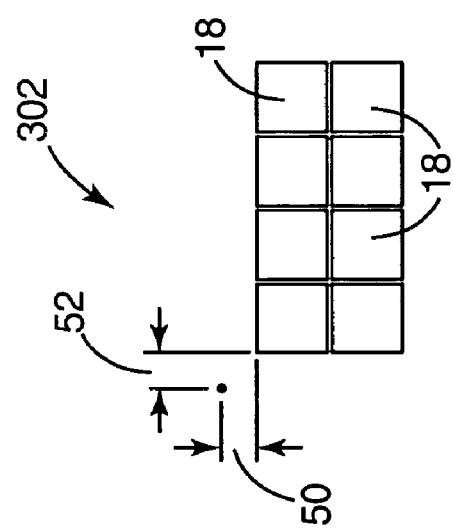
Figure 2A:
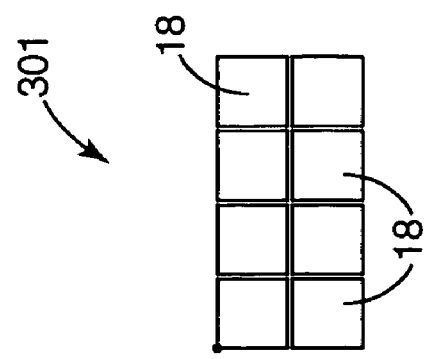

In one embodiment, as illustrated in FIGS. 2A and 2B, image processing unit 24 defines two image sub-frames 30 for image frame 28. More specifically, image processing unit 24 defines a first sub-frame 301 and a second sub-frame 302 for image frame 28. As such, first sub-frame 301 and second sub-frame 302 each include a plurality of columns and a plurality of rows of individual pixels 18 of image data 16. Thus, first sub-frame 301 and second sub-frame 302 each constitute an image data array or pixel matrix of a subset of image data 16.

In one embodiment, as illustrated in FIG. 2B, second sub-frame 302 is offset from first sub-frame 301 by a vertical distance 50 and a horizontal distance 52. As such, second sub-frame 302 is spatially offset from first sub-frame 301 by a predetermined distance. In one illustrative embodiment, vertical distance 50 and horizontal distance 52 are each approximately one-half of one pixel.

As illustrated in FIG. 2C, display device 26 alternates between displaying first sub-frame 301 in a first position and displaying second sub-frame 302 in a second position spatially offset from the first position. More specifically, display device 26 shifts display of second sub-frame 302 relative to display of first sub-frame 301 by vertical distance 50 and horizontal distance 52. As such, pixels of first sub-frame 301 overlap pixels of second sub-frame 302. In one embodiment, display device 26 performs one cycle of displaying first sub-frame 301 in the first position and displaying second sub-frame 302 in the second position for image frame 28. Thus, second sub-frame 302 is spatially and temporally displayed relative to first sub-frame 301. The display of two temporally and spatially shifted sub-frames in this manner is referred to herein as two-position processing.

In another embodiment, as illustrated in FIGS. 3A-3D, image processing unit 24 defines four image sub-frames 30 for image frame 28. More specifically, image processing unit 24 defines a first sub-frame 301, a second sub-frame 302, a third sub-frame 303, and a fourth sub-frame 304 for image frame 28. As such, first sub-frame 301, second sub-frame 302, third sub-frame 303, and fourth sub-frame 304 each include a plurality of columns and a plurality of rows of individual pixels 18 of image data 16.

In one embodiment, as illustrated in FIGS. 3B-3D, second sub-frame 302 is offset from first sub-frame 301 by a vertical distance 50 and a horizontal distance 52, third sub-frame 303 is offset from first sub-frame 301 by a horizontal distance 54, and fourth sub-frame 304 is offset from first sub-frame 301 by a vertical distance 56. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

As illustrated schematically in FIG. 3E, display device 26 alternates between displaying first sub-frame 301 in a first position $P_1$, displaying second sub-frame 302 in a second position $P_2$ spatially offset from the first position, displaying third sub-frame 303 in a third position $P_3$ spatially offset from the first position, and displaying fourth sub-frame 304 in a fourth position $P_4$ spatially offset from the first position. More specifically, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other.

In one embodiment, display device 26 performs one cycle of displaying first sub-frame 301 in the first position, displaying second sub-frame 302 in the second position, displaying third sub-frame 303 in the third position, and displaying fourth sub-frame 304 in the fourth position for image frame 28. Thus, second sub-frame 302, third sub-frame 303, and fourth sub-frame 304 are spatially and temporally displayed relative to each other and relative to first sub-frame 301. The display of four temporally and spatially shifted sub-frames in this manner is referred to herein as four-position processing.

Figure 4E:
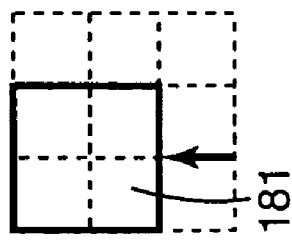
FIGS. 4A-4E are schematic diagrams illustrating the display of a pixel with an image display system according to one embodiment of the present invention.
Figure 4D:
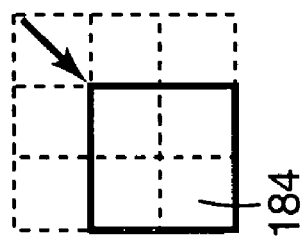
Figure 4C:
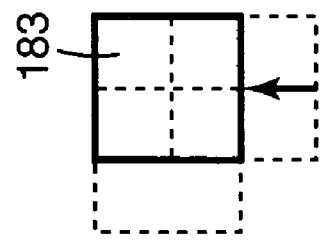
Figure 4B:
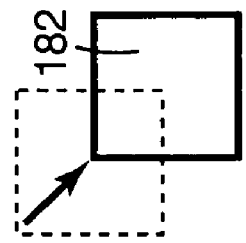
Figure 4A:
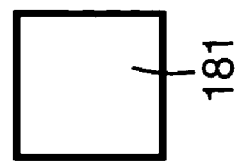

FIGS. 4A-4E illustrate one embodiment of completing one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 4A illustrates display of pixel 181 from first sub-frame 301 in the first position, FIG. 4B illustrates display of pixel 182 from second sub-frame 302 in the second position (with the first position being illustrated by dashed lines), FIG. 4C illustrates display of pixel 183 from third sub-frame 303 in the third position (with the first position and the second position being illustrated by dashed lines), FIG. 4D illustrates display of pixel 184 from fourth sub-frame 304 in the fourth position (with the first position, the second position, and the third position being illustrated by dashed lines), and FIG. 4E illustrates display of pixel 181 from first sub-frame 301 in the first position (with the second position, the third position, and the fourth position being illustrated by dashed lines).

II. Generalized Optimal Sub-Frame Generation

In one embodiment, sub-frame generation unit 36 (FIG. 1) generates sub-frames 30 based on image data in image frame 28. It will be understood by a person of ordinary skill in the art that functions performed by sub-frame generation unit 36 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one form of the invention, sub-frames 30 have a lower resolution than image frame 28. Thus, sub-frames 30 are also referred to herein as low resolution images 30, and image frame 28 is also referred to herein as a high resolution image 28. It will be understood by persons of ordinary skill in the art that the terms low resolution and high resolution are used herein in a comparative fashion, and are not limited to any particular minimum or maximum number of pixels.

The embodiments described above with reference to FIGS. 1-4E involve images with rectangular-shaped (e.g., square) pixels on rectangular grids, with discrete shifts (e.g., one-half pixel shift) between sub-frames 30, which corresponds to an integer pixel shift on a high resolution grid. In one embodiment, display system 10 is configured to generate and display sub-frames 30 having any desired pixel shape, on any desired pixel grid, with any desired shift between sub-frames. One form of the present invention is directed to "generalized" optimal sub-frame generation. The term "generalized" is used because, in one embodiment, the techniques are not limited to discrete space representations of images, or discrete shifts on a discrete pixel grid. Rather, one form of the invention is directed to generating sub-frames 30 based on: (1) Arbitrary pixel grids and arbitrary pixel shapes; (2) non-integer relative sub-frame shifts on a high resolution grid; and (3) sub-frames 30 that are continuously shifted with constant velocity.

In one embodiment of the present invention, optimal sub-frames 30 are generated based on a space-varying de-blurring model. In another embodiment, low resolution sub-frames 30 and high resolution images 28 are modeled using continuous point spread functions and generalized sampling matrices. Low resolution sub-frames 30 at continuous shifts are superimposed to form a simulated high resolution image. The continuous space error between the simulated high resolution image and the actual or desired high resolution image 28 is minimized. Optimal sub-frames 30 are shown to satisfy a certain integral equation. A discrete representation or approximation of the corresponding continuous representation is used in one embodiment to obtain practical solutions for the sub-frames 30. A special case of circular processing, where the sub-frames 30 are continuously shifted at a constant velocity along the radius of a circle, is specifically analyzed. These embodiments are described in further detail below with reference to FIGS. 5-15.

Figure 5:
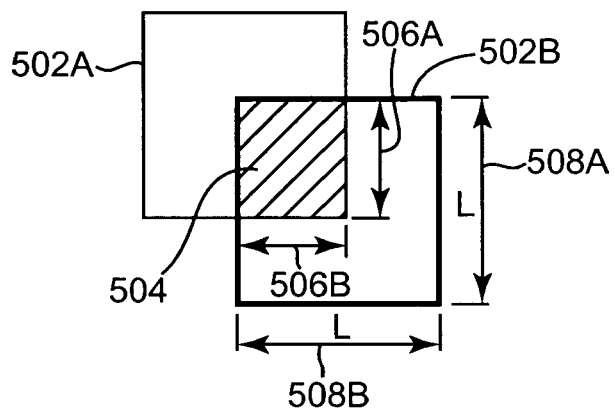
FIG. 5 is a diagram illustrating the generation of a high resolution pixel from two lower resolution sub-frame pixels according to one embodiment of the present invention.

FIG. 5 is a diagram illustrating the generation of a high resolution pixel 504 from two lower resolution sub-frame pixels 502A and 502B (collectively referred to as sub-frame pixels 502) according to one embodiment of the present invention. When sub-frame pixel 502A from a first sub-frame 30 and sub-frame frame pixel 502B from a second sub-frame 30 are displayed in relatively quick succession using two-position processing, this gives the appearance to the human visual system of a high resolution pixel 504.

To simplify the illustration, only two sub-frame pixels 502 are shown in FIG. 5. It will be understood by persons of ordinary skill in the art that each sub-frame 30 will typically have more than one sub-frame pixel 502. It is assumed in one embodiment that the sub-frame pixels 502 from the first and the second sub-frames 30 are each on a separate low resolution rectangular grid, with positions of the pixels 502 identified by [m,n], where "m" is an integer representing a column on the grid and "n" is an integer representing a row on the grid. It is further assumed that the high resolution pixels (e.g., pixel 504) formed from the sub-frame pixels 502 are on a high resolution rectangular grid, with positions of the high resolution pixels identified by [k,l], where "k" is an integer representing a column on the grid and "l" is an integer representing a row on the grid. With these assumptions, a space varying blur, $f_j$, may be defined, as shown in the following Equation I:

$$f_j[m, n; k, l] = \frac{r_j[m, n; k, l]}{L^2} \qquad \text{Equation I}$$

Where:
j=index for identifying individual sub-frames 30;
m, n=indices for identifying a column and row, respectively, of a sub-frame pixel 502;
k, l=indices for identifying a column and a row, respectively, of a high resolution pixel 504 generated from sub-frame pixels 502;
$f_j[m,n;k,l]$=space varying blur;
$L^2$=area of a sub-frame pixel 502; and
$r_j[m,n;k,l]$=fractional area contributed to the high resolution pixel 504 at location [k,l] by the sub-frame pixel 502 at location [m,n].

In the embodiment illustrated in FIG. 5, each sub-frame pixel 502 is assumed to have a height 508A of value L and a width 508B of value L. Thus, the area of each sub-frame pixel 502 is $L^2$. Pixel 502B is shifted by one-half pixel horizontally and one-half pixel vertically with respect to pixel 502A. High resolution pixel 504, therefore, has a height 506A of 0.5L and a width 506B of 0.5L in the illustrated embodiment. Thus, the area of each high resolution pixel 504 in the illustrated embodiment is $0.25L^2$. Using these example values, the fractional area, $r_j$, contributed to high resolution pixel 504 by sub-frame pixel 502B is $0.25L^2$, and the space varying blur, $f_j$, corresponding to high resolution pixel 504 and sub-frame pixel 502B is $0.25L^2$ divided by $L^2$, or 0.25. Likewise, the fractional area, $r_j$, contributed to high resolution pixel 504 by sub-frame pixel 502A is also $0.25L^2$, and the space varying blur, $f_j$, corresponding to high resolution pixel 504 and sub-frame pixel 502A is $0.25L^2$ divided by $L^2$, or 0.25. The fractional area, r$^j$, contributed to a given high resolution pixel by a given sub-frame pixel, as well as the corresponding space-varying blur, f$_j$, will vary depending upon the shape and size of the sub-frame pixels 502, as well as the amount of spatial offset between sub-frames 30.

Using the space-varying blur, f$_j$, defined in the above Equation I, the high resolution image generated from the sub-frames 30 is defined as shown in the following Equation II:

$$h[k, l] = \sum_j \sum_{m,n} f_j[m, n; k, l] l_j[m, n] \quad \text{Equation II}$$

Where:
- j=index for identifying individual sub-frames 30;
- m, n=indices for identifying a column and row, respectively, of a sub-frame pixel 502;
- k, l=indices for identifying a column and a row, respectively, of a high resolution pixel 504 generated from sub-frame pixels 502;
- f$_j$[m,n;k,l]=space varying blur defined in Equation I;
- h[k,l]=value of high resolution pixel 504 at location [k,l] in the high resolution image generated from the sub-frames 30; and
- l$_j$[m,n]=value of the sub-frame pixel 502 at location [m,n] in the sub-frame 30 corresponding to index j.

Thus, as shown by the above Equation II, the high resolution image, h[k,l], generated from multiple temporally and spatially shifted sub-frames 30 is represented by the summation over all of the sub-frame pixel locations (i.e., indices [m,n]) for all of the sub-frames 30 (i.e., index j) contributing to the high resolution image, of the space varying blur, f$_j$, at location [m,n;k,l] multiplied by the sub-frame pixel value, l$_j$, at location [m,n].

Figure 6:
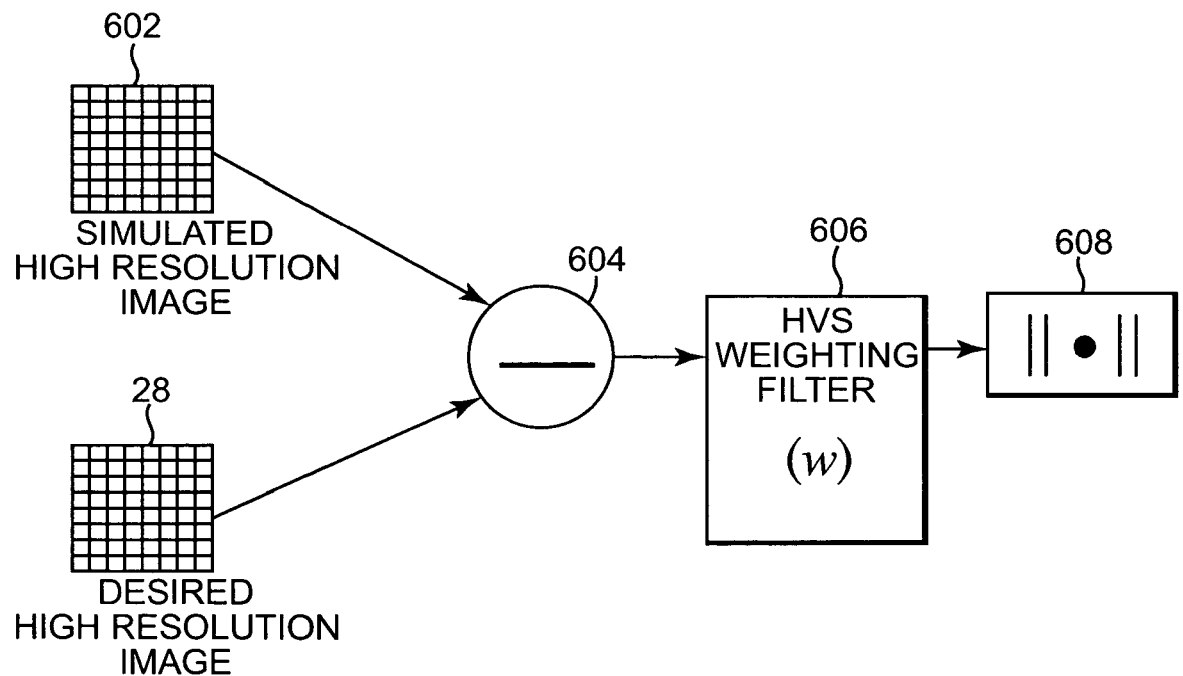
FIG. 6 is a block diagram illustrating the comparison of a simulated high resolution image and a desired high resolution image according to one embodiment of the present invention.

The high resolution image, h[k,l], is referred to herein as a simulated high resolution image. FIG. 6 is a block diagram illustrating the comparison of such a simulated high resolution image 602 and a desired high resolution image 28 according to one embodiment of the present invention. In one embodiment, simulated high resolution image 602 is subtracted on a pixel-by-pixel basis from high resolution image 28 at subtraction stage 604. In one embodiment, the resulting error image data is filtered by a human visual system (HVS) weighting filter (w) 606. In one form of the invention, HVS weighting filter 606 filters the error image data based on characteristics of the human visual system. In one embodiment, HVS weighting filter 606 reduces or eliminates low frequency errors. The mean squared error of the filtered data is then determined at stage 608 to provide a measure of how close the simulated high resolution image 602 is to the desired high resolution image 28. In one embodiment, optimal sub-frames 30 are identified by determining the sub-frame data that provides the minimum error between the simulated high resolution image 602 and the desired high resolution image 28.

As described above with reference to FIG. 5, in one embodiment of the present invention, optimal sub-frames 30 are generated based on a space-varying de-blurring model. In another embodiment, as described below with reference to FIGS. 7-15, low resolution sub-frames 30 and high resolution images 28 are modeled using continuous point spread functions and generalized sampling matrices. In one embodiment, a sampling matrix is used to represent a desired type of dot grid or pixel grid, and a point spread function is used to represent a desired pixel shape.

Figure 7:
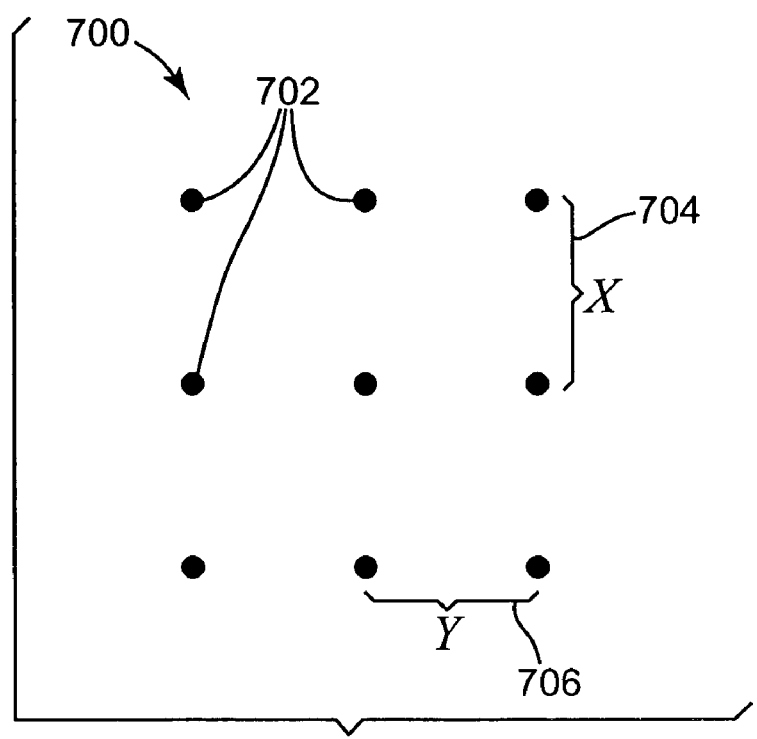
FIG. 7 is a diagram illustrating a dot grid for use in modeling a sub-frame according to one embodiment of the present invention.

FIG. 7 is a diagram illustrating a dot grid 700 for use in modeling a sub-frame 30 according to one embodiment of the present invention. The dot grid 700 is a rectangular grid that includes a plurality of grid points 702 organized in rows and columns. Each row of grid points 702 is separated by a vertical distance 704 of value X, and each column of grid points 702 is separated by a horizontal distance 706 of value Y. A sampling matrix, X, is defined for grid 700 as shown in the following Equation III:

$$X = \begin{pmatrix} X & 0 \\ 0 & Y \end{pmatrix} \quad \text{Equation III}$$

Where:
- X=sampling matrix for dot grid 700;
- X=vertical distance 704 between rows of the grid 700; and
- Y=horizontal distance 706 between columns of the grid 700.

In Equation III, and the Equations that follow, boldface letters are used to indicate a matrix or a vector. The sampling matrix, X, given in Equation III is a diagonal matrix for a rectangular dot grid 700. It will be understood by persons of ordinary skill in the art that if a different type of dot grid is desired, such as a quincunx grid or a hexagonal grid, an appropriate sampling matrix may be defined for the desired type of grid.

Figure 8:
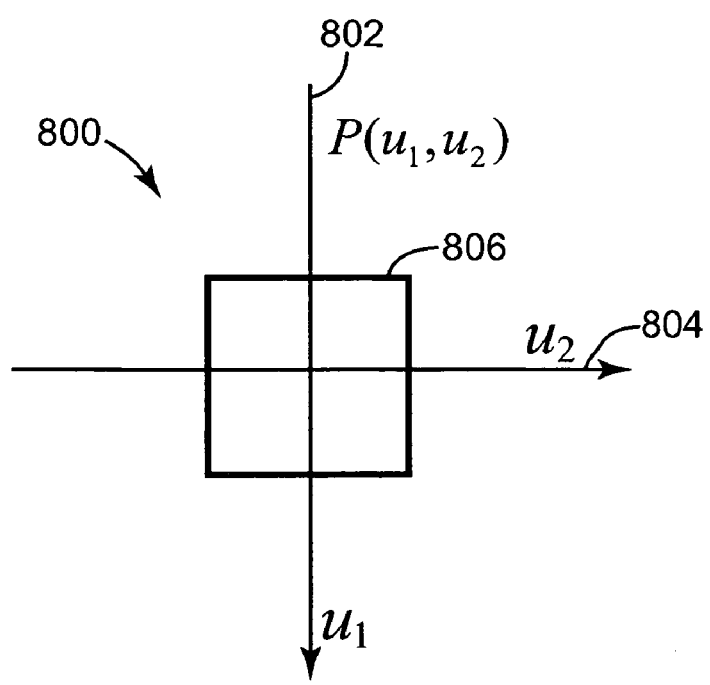
FIG. 8 is a graph of a point spread function for a rectangular pixel shape for use in modeling a sub-frame according to one embodiment of the present invention.

FIG. 8 is a graph 800 of a point spread function 806 for a rectangular pixel shape for use in modeling a sub-frame 30 according to one embodiment of the present invention. Graph 800 includes a vertical axis 802 (u$_1$) and a horizontal axis 804 (u$_2$). The point spread function 806 (P(u$_1$,u$_2$)) in the illustrated embodiment has a rectangular shape (e.g., square shape) that is centered about the origin of the graph 800. In one embodiment, the point spread function 806 has a value of "1" inside of the boundaries of the shape (e.g., inside of the boundaries of the illustrated square), and a value of "0" outside of the boundaries of the shape. It will be understood by persons of ordinary skill in the art that if a different pixel shape is desired, an appropriate point spread function may be defined for the desired pixel shape.

Using the sampling matrix, X, defined in Equation III, and the point-spread function, P(u$_1$,u$_2$) shown in FIG. 8, a sub-frame 30 may be represented in a continuous space form by the following Equation IV:

$$l_x(u) = \sum_n l_x[n] P(u - Xn) \quad \text{Equation IV}$$

Where:
- u=continuous vector with components u$_1$ and u$_2$ identifying a point in continuous space;
- x=continuous vector that identifies a position of a given sub-frame 30 in continuous space;
- l$_x$(u)=intensity value of a point in continuous space at position u for a sub-frame 30 at sub-frame position x;
- n=discrete vector with components n$_1$ and n$_2$ identifying one of the discrete grid points 702 on grid 700 (e.g., n=(0,0), (0,1), (0,2), (1,0), (1,1), (1,2), (2,0), (2,1), or (2,2));
- l$_x$[n]=intensity value associated with the grid point 702 at location n for a sub-frame 30 at sub-frame position x;

X=sampling matrix (e.g., sampling matrix defined in Equation III); and

P(u−Xn)=point spread function for desired pixel shape shifted by −Xn (e.g., point spread function shown in FIG. 8 shifted by −Xn).

Figure 9:
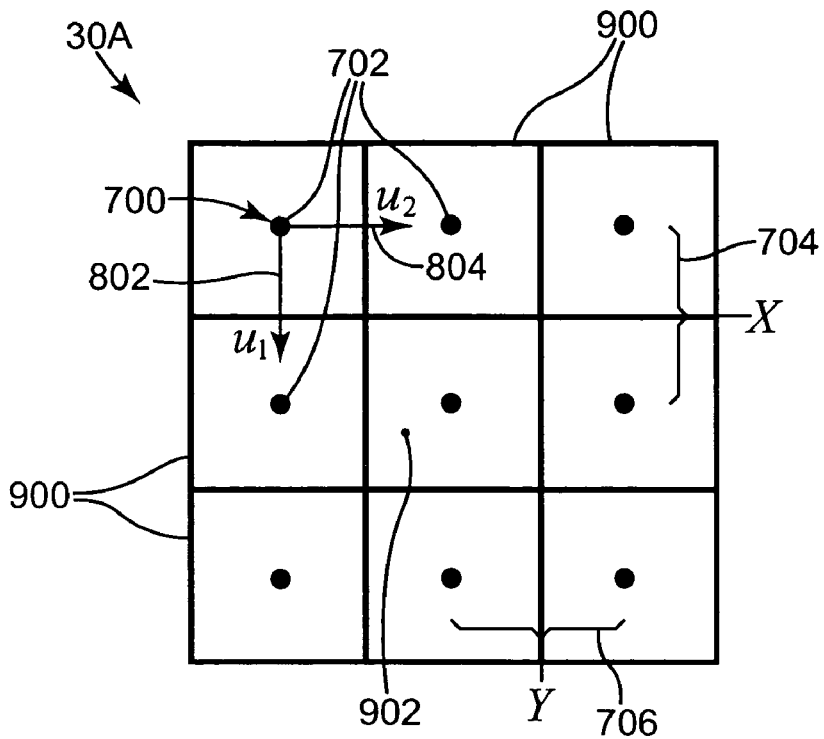
FIG. 9 is a diagram illustrating a continuous space representation of a sub-frame based on the dot grid shown in FIG. 7 and the pixel shape shown in FIG. 8 according to one embodiment of the present invention.

In Equation IV, and the Equations that follow, square brackets are used to indicate a discrete function, and parentheses are used to indicate a continuous function. Equation IV is described in further detail below with reference to FIG. 9. FIG. 9 is a diagram illustrating a continuous space representation of a sub-frame 30A based on the discrete dot grid 700 shown in FIG. 7 and the pixel shape shown in FIG. 8 according to one embodiment of the present invention. Sub-frame 30A includes a 3×3 array of pixels 900, with each pixel 900 having the same shape (e.g., square) as the point spread function 806 (FIG. 8), and each pixel 900 centered on one of the grid points 702. Each discrete grid point 702 has an intensity value associated with it, which is represented in Equation IV by $l_x[n]$. The pixels 900 are represented in Equation IV by the point spread function, P(u−Xn).

Using Equation IV, the intensity value of any arbitrary point in continuous space at position u for sub-frame 30A may be determined. For example, the intensity value at point 902 in sub-frame 30A may be determined using Equation IV. As shown by Equation IV, the intensity value at point 902 is the summation over all of the grid points 702 (identified by vector n) of the intensity value associated with the current grid point 702 under consideration (i.e., $l_x[n]$) multiplied by the value of the point spread function at a position u−Xn, where u in this example is a vector identifying the position of the point 902, and Xn is the sampling matrix (e.g., the sampling matrix given in Equation III) multiplied by the vector representing the position of the current grid point 702 under consideration. As mentioned above, in one embodiment, the value for the point spread function is either a "0" or a "1". Thus, in this embodiment, each multiplication, $l_x[n]$ P(u−Xn), in Equation IV will result in either a "0" value, or an intensity value $l_x[n]$.

Figure 10:
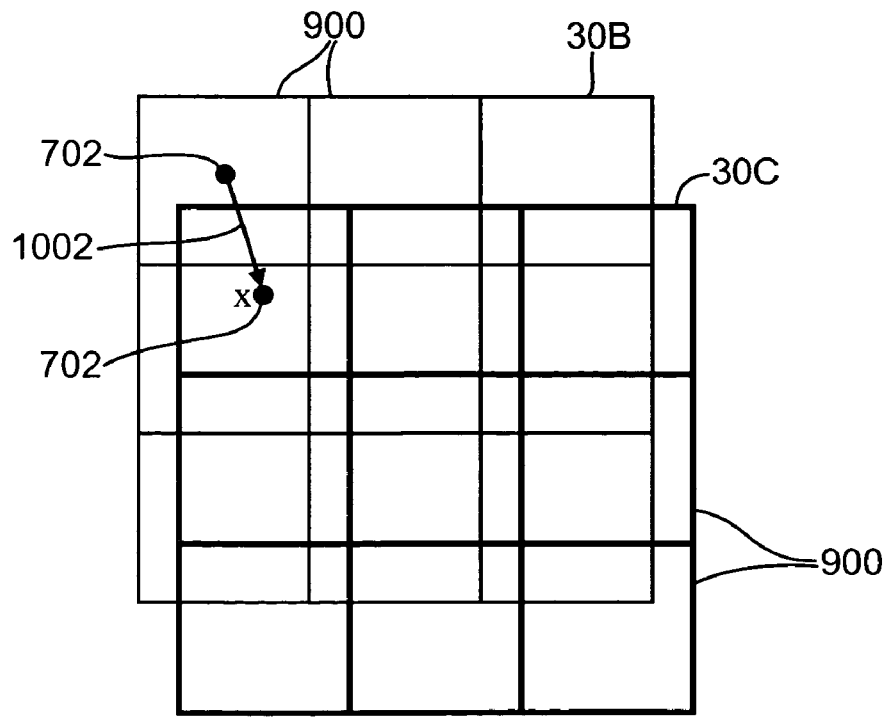
FIG. 10 is a diagram illustrating two sub-frames offset from one another according to one embodiment of the present invention.

FIG. 10 is a diagram illustrating two sub-frames 30B and 30C offset from one another according to one embodiment of the present invention. Sub-frame 30B and 30C each include a plurality of pixels 900. Each pixel 900 is centered on a grid point 702. As shown in FIG. 10, sub-frame 30C is shifted down and to the right with respect to sub-frame 30B. The shift of sub-frame 30C with respect to sub-frame 30B is represented by a vector 1002 (vector x), which originates from the grid point 702 in the upper left corner of sub-frame 30B and extends to the grid point 702 in the upper left corner of sub-frame 30C.

In one embodiment, display device 26 (FIG. 1) displays multiple sub-frame 30, such as sub-frames 30B and 30C, in a temporally and spatially shifted manner to produce displayed image 14, which can appear to have a higher resolution than the individual sub-frames 30. One embodiment of the present invention models displayed image 14 based on the continuous space representation of a sub-frame 30 given in Equation IV and described above with reference to FIGS. 7-9. The model or representation of the displayed image 14 is referred to herein as a simulated high resolution image. The following Equation V gives a continuous space representation of the displayed image 14 based on the continuous space representation of sub-frames 30 given above in Equation IV:

$$\hat{h}(u; l_x) = C \int_{x \in \wp} \sum_n l_x[n] P(u - x - Xn) dx \quad \text{Equation V}$$

Where:
   u=continuous vector with components $u_1$ and $u_2$ identifying a point in continuous space;
   x=continuous vector that identifies a position of a given sub-frame 30 (e.g., vector 1002) in continuous space;
   $\hat{h}(u; l_x)$=intensity value of the simulated high resolution image at a point in continuous space at position u as a function of $l_x$;
   C=constant to ensure brightness preservation;
   n=discrete vector with components $n_1$ and $n_2$ identifying one of the discrete grid points 702 on grid 700 (e.g., n=(0,0), (0,1), (0,2), (1,0), (1,1), (1,2), (2,0), (2,1), or (2,2));
   $l_x[n]$=intensity value associated with the grid point 702 at location n for a sub-frame 30 at sub-frame position x;
   X=sampling matrix (e.g., sampling matrix defined in Equation III);
   P(u−x−Xn)=point spread function for desired pixel shape shifted by −x−Xn (e.g., point spread. function shown in FIG. 8 shifted by −x−Xn); and
   $\wp$=the set of all sub-frame shifts Using Equation V, the intensity value, $\hat{h}$, of any arbitrary point in continuous space at position u in the simulated high resolution image may be determined. As shown by Equation V, the intensity value at a given position u is an integral over the set of allowable sub-frame shifts. The integrand in Equation V is the same summation as in Equation IV above, with the exception that a "−x" has been added to the point spread function to take into account the shifts of the sub-frames 30.

In one embodiment, sub-frames 30 and simulated high resolution images are modeled using sampling matrices and point spread functions, as shown in Equations IV and V, respectively. In one form of the invention, the desired high resolution images 28 are also modeled using sampling matrices and point spread functions as described in further detail below with reference to FIGS. 11-13.

Figure 11:
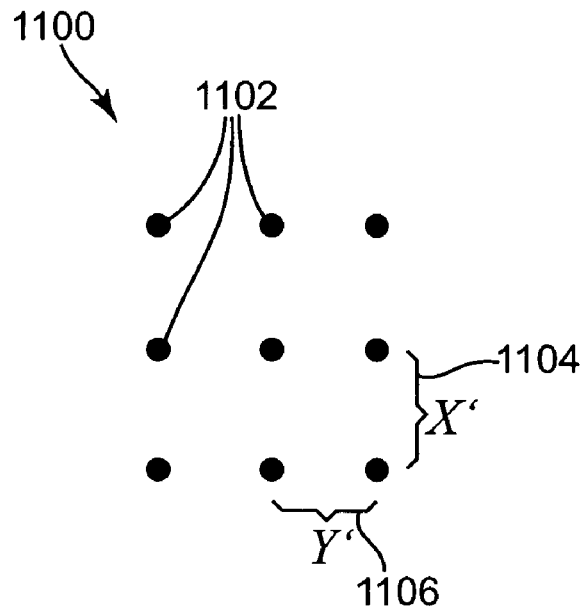
FIG. 11 is a diagram illustrating a dot grid for use in modeling a high resolution frame according to one embodiment of the present invention.

FIG. 11 is a diagram illustrating a dot grid 1100 for use in modeling a high resolution frame 28 according to one embodiment of the present invention. The dot grid 1100 is a rectangular grid that includes a plurality of grid points 1102 organized in rows and columns. Each row of grid points 1102 is separated by a vertical distance 1104 of value X', and each column of grid points 1102 is separated by a horizontal distance 1106 of value Y'. A sampling matrix, X', is defined for grid 1100 as shown in the following Equation VI:

$$X' = \begin{pmatrix} X' & 0 \\ 0 & Y' \end{pmatrix} \quad \text{Equation VI}$$

Where:
   X'=sampling matrix for dot grid 1100;
   X'=vertical distance 1104 between rows of the grid 1100; and
   Y'=horizontal distance 1106 between columns of the grid 1100.

The sampling matrix, X', given in Equation VI is a diagonal matrix for a rectangular dot grid 1100. It will be understood by persons of ordinary skill in the art that if a different type of dot grid is desired, an appropriate sampling matrix may be defined for the desired type of grid. In one embodiment, the spacing between grid points 1102 for grid 1100, which is used in modeling a desired high resolution image 28, is smaller than the spacing between grid points 702 for grid 700 (FIG. 7), which is used in modeling lower resolution sub-frames 30.

Figure 12:
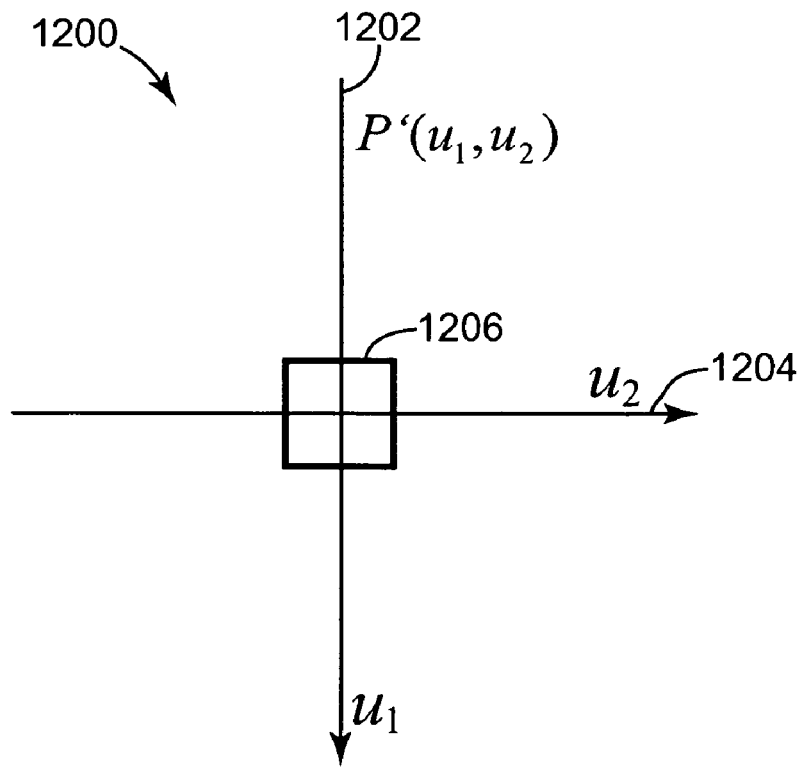
FIG. 12 is a graph of a point spread function for a rectangular pixel shape for use in modeling a high resolution frame according to one embodiment of the present invention.

FIG. 12 is a graph 1200 of a point spread function 1206 for a rectangular pixel shape for use in modeling a high resolution frame 28 according to one embodiment of the present invention. Graph 1200 includes a vertical axis 1202 ($u_1$) and a horizontal axis 1204 ($u_2$). The point spread function 1206 (P'($u_1,u_2$)) in the illustrated embodiment has a rectangular shape (e.g., square shape) that is centered about the origin of the graph 1200. In one embodiment, the point spread function 1206 has a value of "1" inside of the boundaries of the shape (e.g., inside of the boundaries of the illustrated square), and a value of "0" outside of the boundaries of the shape. It will be understood by persons of ordinary skill in the art that if a different pixel shape is desired, an appropriate point spread function may be defined for the desired pixel shape. In one embodiment, the size of the pixel shape defined by function 1206, which is used in modeling a desired high resolution image 28, is smaller than the size of the pixel shape defined by function 806, which is used in modeling lower resolution sub-frames 30.

Using the sampling matrix, X', defined in Equation VI, and the point-spread function, P'($u_1,u_2$) shown in FIG. 11, a desired high resolution image 28 may be represented in a continuous space form by the following Equation VII:

$$h(u) = \sum_k h[k] P'(u - X'k) \qquad \text{Equation VII}$$

Where:
u=continuous vector with components $u_1$ and $u_2$ identifying a point in continuous space;
h(u)=intensity value of a point in continuous space at position u for a high resolution image 28;
k=discrete vector with components $k_1$ and $k_2$ identifying one of the discrete grid points 1102 on grid 1100 (e.g., k=(0,0), (0,1), (0,2), (1,0), (1,1), (1,2), (2,0), (2,1), or (2,2));
h[k]=intensity value associated with the grid point 1102 at location k for a high resolution image 28;
X'=sampling matrix (e.g., sampling matrix defined in Equation VI); and
P'(u–X'k)=point spread function for desired pixel shape shifted by –X'k (e.g., point spread function shown in FIG. 12 shifted by –X'k).

Figure 13:
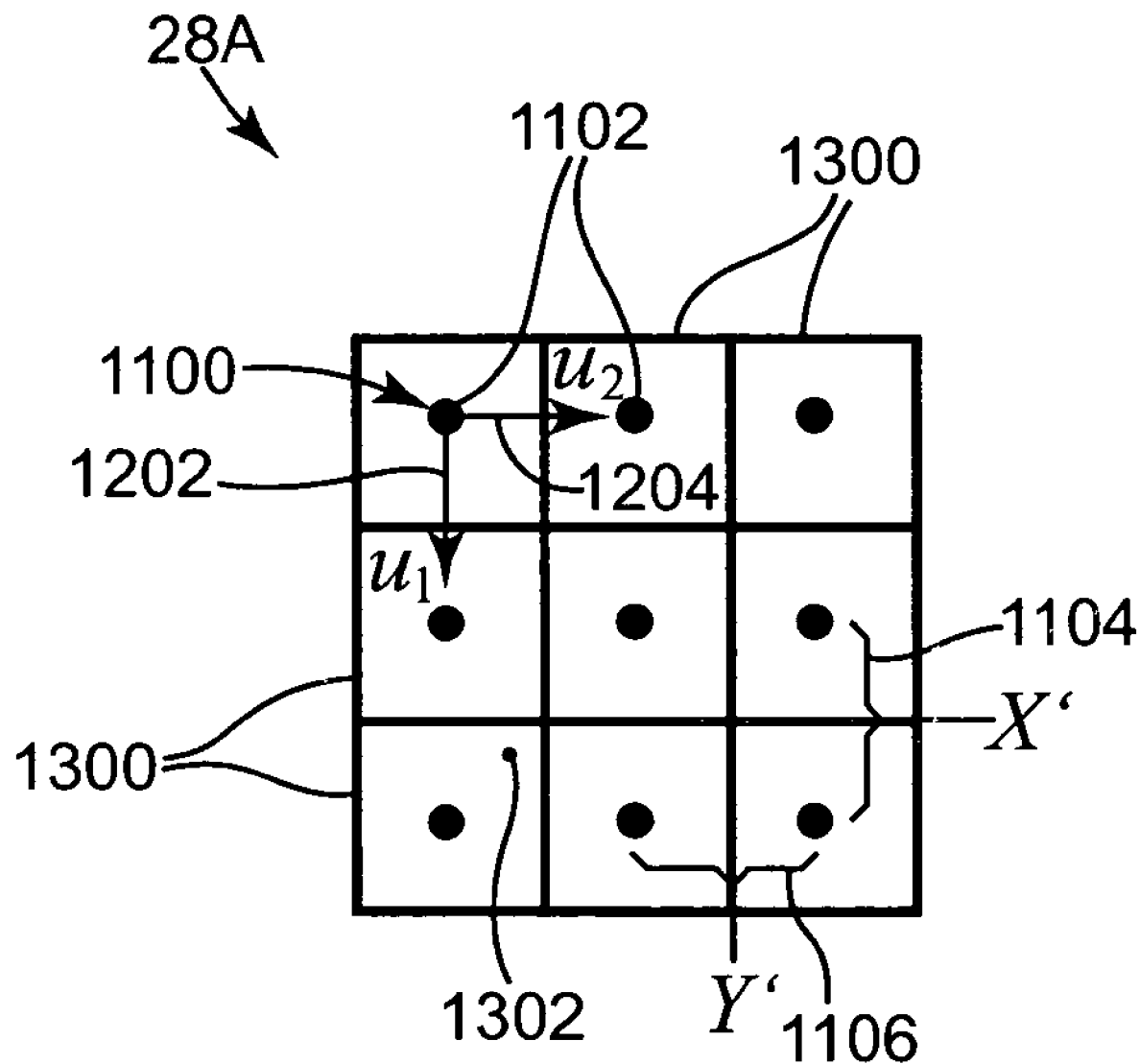
FIG. 13 is a diagram illustrating a continuous space representation of a high resolution frame based on the dot grid shown in FIG. 11 and the pixel shape shown in FIG. 12 according to one embodiment of the present invention.

Equation VII is described in further detail below with reference to FIG. 13. FIG. 13 is a diagram illustrating a continuous space representation of a high resolution frame 28A based on the discrete dot grid 1100 shown in FIG. 11 and the pixel shape shown in FIG. 12 according to one embodiment of the present invention. High resolution frame 28A includes a 3×3 array of pixels 1300, with each pixel 1300 having the same shape (e.g., square) as the point spread function 1206 (FIG. 12), and each pixel 1300 centered on one of the grid points 1102. Each discrete grid point 1102 has an intensity value associated with it, which is represented in Equation VII by h[k]. The pixels 1300 are represented in Equation VII by the point spread function, P'(u–X'k).

Using Equation VII, the intensity value of any arbitrary point in continuous space at position u for high resolution image 28A may be determined. For example, the intensity value at point 1302 in image 28A may be determined using Equation VII. As shown by Equation VII, the intensity value at point 1302 is the summation over all of the grid points 1102 (identified by vector k) of the intensity value associated with the current grid point 1102 under consideration (i.e., h[k]) multiplied by the value of the point spread function at a position u–X'k, where u in this example is a vector identifying the position of the point 1302, and X'k is the sampling matrix (e.g., the sampling matrix given in Equation VI) multiplied by the vector representing the position of the current grid point 1102 under consideration. As mentioned above, in one embodiment, the value for the point spread function is either a "0" or a "1". Thus, in this embodiment, each multiplication, h[k] P'(u–X'k), in Equation VII, will result in either a "0" value, or an intensity value h[k].

In one form of the present invention, optimal sub-frames 30 are generated based on the models described above with reference to FIGS. 7-13. The function $\hat{h}(u;l_x)$, which is defined in Equation V above, represents a simulated high resolution image that is a function of sub-frame image data, $l_x$. The function h(u), which is defined in Equation VII above, represents a desired high resolution image 28. The difference between the simulated high resolution image ($\hat{h}(u;l_x)$) and the desired or known high resolution image (h(u)) represents an error. It is desirable to choose appropriate sub-frame image data, $l_x$, such that the simulated high resolution image is as close as possible to the known high resolution image, so that the error is minimized. This minimization problem is expressed in the following Equation VIII:

$$l^*_x[\bullet] = \underset{l_x[\bullet]}{\operatorname{argmin}} \int_u |\hat{h}(u; l_x) - h(u)|^2 du \qquad \text{Equation VIII}$$

Where:
$I^*_x$=optimal sub-frame image data;
u=continuous vector with components $u_1$ and $u_2$ identifying a point in continuous space;
$\hat{h}(u;l_x)$=intensity value of simulated high resolution image at a point in continuous space at position u as a function of $l_x$ as defined in Equation V; and
h(u)=intensity value of a point in continuous space at position u for a high resolution image 28 as defined in Equation VII.

As shown in the above Equation VIII, the optimal sub-frame image data, $l^*_x$, for the sub-frame 30 at a sub-frame shift, x, are the data, $l_x$, that minimize the integral. The integrand is the absolute value squared of the difference between the simulated high resolution image data, $\hat{h}(u;l_x)$, and the known high resolution image data, h(u). The integrand is integrated over continuous space, u, with the boundaries of the continuous space being defined based on the size of the displayed image 14. In one embodiment, image processing unit 24 includes conventional numerical computation software to determine optimal sub-frame image data, $l^*_x$, at each sub-frame shift, based on Equation VIII.

III. Circular Processing

Figure 14:
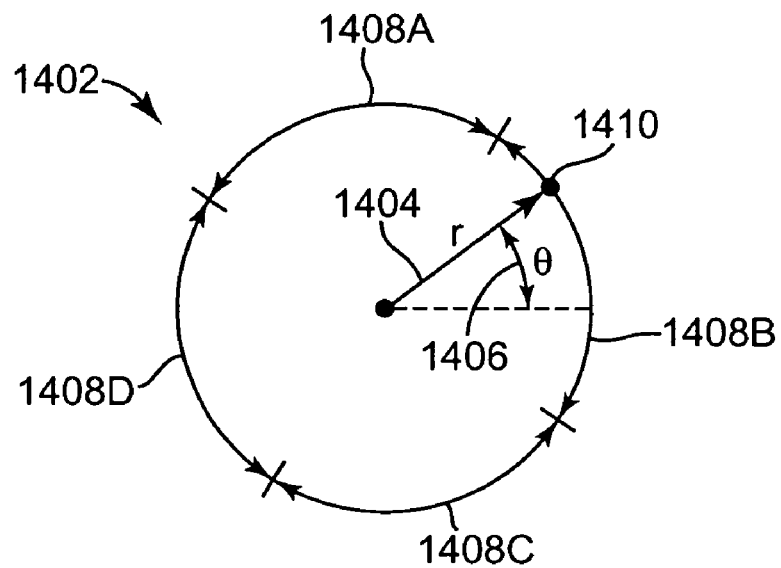
FIG. 14 is a diagram illustrating a circle for circular processing according to one embodiment of the present invention.

Equation VIII provides a generalized solution for determining optimal sub-frame data for any arbitrary set of continuous-space shifts between sub-frames 30. A special case of this generalized solution is circular processing, where the shifts between sub-frames 30 in one embodiment are at a constant velocity along a circle. FIG. 14 is a diagram illustrating a circle 1402 for circular processing according to one embodiment of the present invention. Circle 1402 has a radius

1404 of value r. Any position 1410 on the circle 1402 can be identified based on the radius 1404 and an angle 1406 from a given reference point, which has a value of θ. In one form of the invention, sub-frames 30 are displayed at continuous shifts along the circle 1402. In another form of the invention, sub-frames 30 are displayed at discrete shifts along the circle 1402.

In one embodiment, circle 1402 is divided into a plurality of regions 1408A-1408D (collectively referred to as regions 1408). In the illustrated embodiment, each region 1408 corresponds to one quadrant of the circle 1402. Each region 1408 includes a plurality of potential sub-frame positions, which are positions on the circle 1402 within the boundaries of the region 1408. In one embodiment, for any given region 1408, the sub-frames 30 displayed at sub-frame positions within that region 1408 each have the same sub-frame image data. Thus, the sub-frames 30 corresponding to any given region 1408 are the same, but are displayed at different positions along the circle 1402 in that region 1408. Thus, the sub-frames 30 corresponding to any given region 1408 essentially appear as one sub-frame 30 smeared around a quadrant of the circle 1402. This smearing of sub-frames 30 is described in further detail below with reference to FIG. 15.

Figure 15:
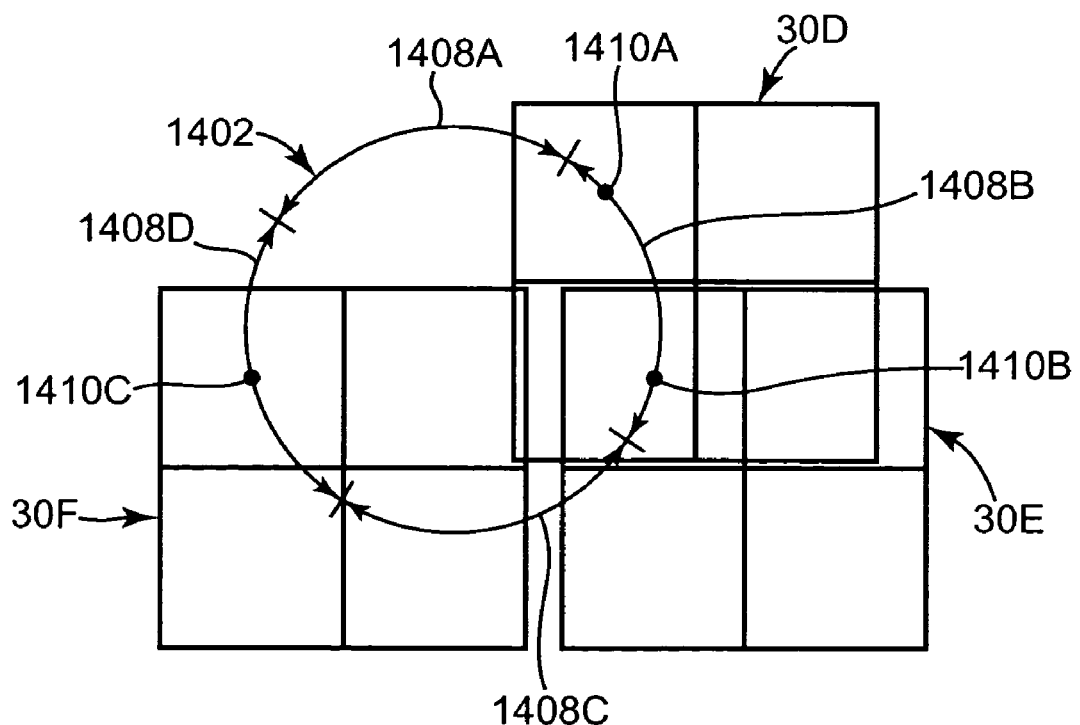
FIG. 15 is a diagram illustrating a plurality of sub-frames shifted along a circle according to one embodiment of the present invention.

FIG. 15 is a diagram illustrating a plurality of sub-frames 30 shifted along a circle 1402 according to one embodiment of the present invention. As shown in FIG. 15, sub-frame 30D is displayed at sub-frame position 1410A on circle 1402, sub-frame 30E is displayed at sub-frame position 1410B on circle 1402, and sub-frame 30F is displayed at sub-frame position 1410C on circle 1402. Since sub-frames 30D and 30E are displayed at sub-frame positions 1410 within the same region 1408B, in one embodiment, sub-frames 30D and 30E have the same sub-frame image data, which is different than the image data for sub-frame 30F. Three sub-frames 30 are shown in FIG. 15 to illustrate circular processing according to one form of the invention. It will be understood by persons of ordinary skill that any desired number of sub-frames 30 may be displayed along circle 1402.

In one embodiment, the sub-frames 30 for circular processing are defined in the same manner as defined in Equation IV above, but the subscript "Θ" is used to identify a sub-frame position 1410 on the circle 1402, rather than the subscript "x", which was used in Equation IV to identify a sub-frame position anywhere in continuous space. Using the sampling matrix, X, defined in Equation III, and the point-spread function, P(u₁,u₂) shown in FIG. 8, a sub-frame 30 for circular processing may be represented in a continuous space form by the following Equation IX:

$$l_\Theta(u) = \sum_n l_\Theta[n] P(u - Xn) \qquad \text{Equation IX}$$

Where:
  u=continuous vector with components $u_1$ and $u_2$ identifying a point in continuous space;
  Θ=angle that identifies a position of a given sub-frame 30 on circle 1402;
  $l_\Theta(u)$=intensity value of a point in continuous space at position u for a sub-frame 30 at sub-frame position Θ;
  n=discrete vector with components $n_1$ and $n_2$ identifying one of the discrete grid points 702 on grid 700 (e.g., n=(0,0), (0,1), (0,2), (1,0), (1,1), (1,2), (2,0), (2,1), or (2,2));
  $l_\Theta[n]$=intensity value associated with the grid point 702 at location n for a sub-frame 30 at sub-frame position Θ;
  X=sampling matrix (e.g., sampling matrix defined in Equation III); and
  P(u–Xn)=point spread function for desired pixel shape shifted by –Xn (e.g., point spread function shown in FIG. 8 shifted by –Xn).

For circular processing, the position of a given sub-frame 30 along the circle 1402 can be determined using the following Equation X:

$$R = \begin{pmatrix} r\cos\Theta & 0 \\ 0 & r\sin\Theta \end{pmatrix} \qquad \text{Equation X}$$

Where:
  R=matrix for determining the position of a given sub-frame 30 along the circle 1402;
  r=radius of the circle 1402; and
  Θ=angle from a given reference point on the circle 1402.

In one embodiment, display device 26 (FIG. 1) displays multiple sub-frames 30, such as sub-frames 30D, 30E, and 30F, in a temporally and spatially shifted manner along a circle 1402 to produce displayed image 14, which can appear to have a higher resolution than the individual sub-frames 30. In one embodiment, display device 26 performs multiple iterations of displaying a set of sub-frames 30 along the circle 1402 (i.e., multiple trips are made around the complete circle 1402). In one embodiment, the set of sub-frames 30 displayed during a given iteration correspond to one image frame 28. Thus, in one form of the invention, a first set of sub-frames 30 corresponding to a first image frame 28 are displayed along the circle 1402 to produce a first displayed image 14, a second set of sub-frames 30 corresponding to a second image frame 28 are displayed along the circle 1402 to produce a second displayed image 14, etc.

One embodiment of the present invention models displayed image 14 based on the continuous space representation of a sub-frame 30 given in Equation IX. The model or representation of the displayed image 14 is referred to herein as a simulated high resolution image. The following Equation XI gives a continuous space representation of the displayed image 14 based on the continuous space representation of sub-frames 30 given above in Equation IX:

$$\hat{h}(u; l_{\Theta\{i\}}) = \frac{1}{2\pi} \sum_i \int_{\Theta_i \in \varphi_i} \sum_n l_{\Theta_i}[n] P(u - R_i 1 - Xn) d\Theta_i \qquad \text{Equation XI}$$

Where:
  u=continuous vector with components $u_1$ and $u_2$ identifying a point in continuous space;
  Θ=angle that identifies a position of a given sub-frame 30 on circle 1402;
  i=index for identifying regions 1408 of the circle 1402;
  $\hat{h}(u; l_{\Theta\{i\}})$=intensity value of the simulated high resolution image at a point in continuous space at position u as a function of $l_{\Theta\{i\}}$;
  n=discrete vector with components $n_1$ and $n_2$ identifying one of the discrete grid points 702 on grid 700 (e.g., n=(0,0), (0,1), (0,2), (1,0), (1,1), (1,2), (2,0), (2,1), or (2,2));

$l_{\Theta i}[n]$=intensity value associated with the grid point 702 at location n for a sub-frame 30 at sub-frame position $\Theta_i$;

X=sampling matrix (e.g., sampling matrix defined in Equation III);

$R_i\mathbf{1}$=matrix, such as given in Equation X, for identifying a position of a given sub-frame 30 on the circle 1402, multiplied by a unit vector;

P(u–$R_i\mathbf{1}$–Xn)=point spread function for desired pixel shape shifted by –$R_i\mathbf{1}$–Xn (e.g., point spread function shown in FIG. 8 shifted by –$R_i\mathbf{1}$–Xn); and $\wp_i$=the set of all shifts along the ith region 1408 of circle 1402

Using Equation XI, the intensity value, ĥ, of any arbitrary point in continuous space at position u in the simulated high resolution image may be determined. As shown by Equation XI, the intensity value at a given position u is a summation over the various regions 1408 of the circle 1402 (which are identified by the index i) of an integral. In the embodiment illustrated in FIGS. 14 and 15, there are four regions 1408, so the index i ranges from 1 to 4. The integral for each region 1408 (i.e., for each value of i) is over the set of allowable sub-frame positions along the circle 1402 for the current region 1408. The integrand in Equation XI is essentially the same summation as in Equation IX above, with the exception that a "–$R_i\mathbf{1}$" has been added to the point spread function to take into account the shifts of the sub-frames 30.

Since each region 1408 is non-overlapping in the embodiment illustrated in FIGS. 14 and 15, the intersection of the set of allowable sub-frame positions in each region 1408 is a null set, as shown in the following Equation XII:

$$\bigcap_i \wp_i = \phi \qquad \text{Equation XII}$$

The combination of the regions 1408 spans a complete circle 1402, so the union of the set of allowable sub-frame positions in each region 1408 ranges from 0 to $2\pi$, as shown in the following Equation XIII:

$$\bigcup_i \wp_i = [0, 2\pi] \qquad \text{Equation XIII}$$

In one form of the present invention, optimal sub-frames 30 are generated for circular processing based on the models described above with reference to FIGS. 14 and 15, and Equations IX-XIII. The function $\hat{h}(u; l_{\Theta\{i\}})$, which is defined in Equation XI above, represents a simulated high resolution image that is a function of sub-frame image data, $l_{\Theta\{i\}}$. The function h(u), which is defined in Equation VII above, represents a desired high resolution image 28. The difference between the simulated high resolution image ($\hat{h}(u; l_{\Theta\{i\}})$) and the desired or known high resolution image (h(u)) represents an error. It is desirable to choose appropriate sub-frame image data, $l_{\Theta\{i\}}$, such that the simulated high resolution image is as close as possible to the known high resolution image, so that the error is minimized. This minimization problem is expressed in the following Equation XIV:

$$l^*\Theta_{\{i\}}[\cdot] = \underset{l_{\Theta\{i\}}[\cdot]}{\operatorname{argmin}} \int_u |\hat{h}(u; l_{\Theta\{i\}}) - h(u)|^2 du \qquad \text{Equation XIV}$$

Where:
- $l^*_{\Theta\{i\}}$=optimal sub-frame image data;
- $\Theta$=angle that identifies a position of a given sub-frame 30 on circle 1402;
- i=index for identifying regions 1408 of the circle 1402;
- u=continuous vector with components $u_1$ and $u_2$ identifying a point in continuous space;
- $\hat{h}(u; l_{\Theta\{i\}})$=intensity value of simulated high resolution image at a point in continuous space at position u as a function of $l_{\Theta\{i\}}$ as defined in Equation XI; and
- h(u)=intensity value of a point in continuous space at position u for a high resolution image 28 as defined in Equation VII.

As shown in the above Equation XIV, the optimal sub-frame image data, $l^*_{\Theta\{i\}}$, for the sub-frame 30 at a sub-frame shift, $\Theta_{\{i\}}$, are the data, $l_{\Theta\{i\}}$, that minimize the integral. The integrand is the absolute value squared of the difference between the simulated high resolution image data, $\hat{h}(u; l_{\Theta\{i\}})$, and the known high resolution image data, h(u). The integrand is integrated over continuous space, u, with the boundaries of the continuous space being defined based on the size of the displayed image 14.

Taking the derivative of Equation XIV with respect to $l_{\Theta\{i\}}$ and setting equal to zero results in the following Equation XV:

$$\frac{1}{2\pi}\int_u \int_{\Theta_i \in \wp_i} P(u - R_i\mathbf{1} - Xn)(\hat{h}(u; l^*\Theta_{\{i\}}) - h(u))d\Theta_i\, du = 0 \qquad \text{Equation XV}$$

Where:
- u=continuous vector with components $u_1$ and $u_2$ identifying a point in continuous space;
- i=index for identifying regions 1408 of the circle 1402;
- $\Theta$=angle that identifies a position of a given sub-frame 30 on circle 1402;
- $R_i\mathbf{1}$=matrix, such as given in Equation X, for identifying a position of a given sub-frame 30 on the circle 1402, multiplied by a unit vector;
- X=sampling matrix (e.g., sampling matrix defined in Equation III);
- n=discrete vector with components $n_1$ and $n_2$ identifying one of the discrete grid points 702 on grid 700 (e.g., n=(0,0), (0,1), (0,2), (1,0), (1,1), (1,2), (2,0), (2,1), or (2,2));
- P(u–$R_i\mathbf{1}$–Xn)=point spread function for desired pixel shape shifted by –$R_i\mathbf{1}$–Xn (e.g., point spread function shown in FIG. 8 shifted by –$R_i\mathbf{1}$–Xn);
- $\hat{h}(u; l^*_{\Theta\{i\}})$=intensity value of simulated high resolution image at a point in continuous space at position u as a function of $l^*_{\Theta\{i\}}$;
- h(u)=intensity value of a point in continuous space at position u for a high resolution image 28 as defined in Equation VII; and
- $\wp_i$=the set of all shifts along the ith region 1408 of circle 1402

In one embodiment, Equation XV, which is a linear integral equation, is solved for $l^*_{\Theta\{i\}}[n]$, which is the optimal sub-frame image data at each of the discrete grid points 702 on grid 700 for the sub-frames 30 at each shift along the circle 1402. In one form of the invention, image processing unit 24 includes conventional numerical computation software to determine the optimal sub-frame image data, $l^*_{\Theta\{i\}}[n]$, at each sub-frame shift based on Equation XV.

In one form of the invention, a discrete version of Equation XV is generated by replacing the integrals with discrete sums, considering only discrete positions on the circle 1402, and using a discrete version of the point spread function. A discrete version of Equation XV is given in the following Equation XVI:

$$\frac{dJ}{dl_{\Theta_j}[t]} = \sum_m \sum_{k_{\Theta_j} \in \wp_j} P[m - k_{\Theta_j} - t](\hat{h}[m; l^*\Theta_{\{j\}}] - h[m])$$ Equation XVI Where:
J=the integral from Equation XIV;
m=discrete vector identifying a point in discrete space (i.e., discrete version of u in Equation XV);
j=index for identifying regions 1408 of the circle 1402;
Θ=angle that identifies a position of a given sub-frame 30 on circle 1402;
$k_{\Theta_j}$=discrete vector for identifying a position of a given sub-frame 30 on the circle 1402 (i.e., discrete version of $R_i1$ in Equation XV);
t=discrete vector for identifying positions of the discrete grid points 702 on grid 700;
$P[m-k_{\Theta_j}-t]$=point spread function for desired pixel shape shifted by $-k_{\Theta_j}-t$ (e.g., point spread function shown in FIG. 8 shifted by $-k_{\Theta_j}-t$);
$\hat{h}[m; l^*_{\Theta\{i\}}]$ intensity value of simulated high resolution image at a point in discrete space at position m as a function of $l^*_{\Theta\{j\}}$;
h[m]=intensity value of a point in discrete space at position m for a high resolution image 28;
$\wp_j$=the set of discrete shifts along the jth region 1408 of circle 1402;
$|\wp_j| \to \infty$ for the best discrete approximation In one embodiment, image processing unit 24 includes conventional numerical computation software to determine the optimal sub-frame image data, $l^*_{\Theta\{j\}}[t]$, at each sub-frame shift based on Equation XVI.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying an image with a display device, the method comprising:
receiving image data for the image;
generating a plurality of multiple-pixel image sub-frames corresponding to the image data;
displaying the sub-frames in a circularly-shifted manner at a set of spatially offset positions located on a circle; and
wherein the plurality of sub-frames are generated based on a set of spatially offset sub-frame positions, a first function that represents a simulated high resolution image that is based on the superimposition of circularly-shifted sub-frames, and a second function that represents a desired high resolution image.

2. The method of claim 1, wherein the sub-frames are displayed with a temporal offset.

3. The method of claim 1, wherein the sub-frames are shifted around the circle at a constant velocity.

4. The method of claim 1, wherein the plurality of sub-frames includes four sub-frames, and wherein a first one of the sub-frames is displayed at multiple positions along a first quadrant of the circle, a second one of the sub-frames is displayed at multiple positions along a second quadrant of the circle, a third one of the sub-frames is displayed at multiple positions along a third quadrant of the circle, and a fourth one of the sub-frames is displayed at multiple positions along a fourth quadrant of the circle.

5. The method of claim 1, and further comprising:
receiving a second set of image data for a second image;
generating a second plurality of sub-frames corresponding to the second set of image data; and
displaying the sub-frames in the second plurality at the set of spatially offset positions located on the circle.

6. The method of claim 1, wherein the first function includes a matrix for defining characteristics of a pixel grid for the sub-frames.

7. The method of claim 1, wherein the second function includes a matrix for defining characteristics of a pixel grid for the desired high resolution image.

8. The method of claim 1, wherein the first function includes a pixel shape function for defining characteristics of pixels of the sub-frames.

9. The method of claim 1, wherein the second function includes a pixel shape function for defining characteristics of pixels of the desired high resolution image.

10. The method of claim 1, wherein the sub-frames are generated based on an integral equation that includes the first function and the second function.

11. The method of claim 10, wherein an integrand of the integral equation includes a difference between the first function and the second function.

12. A system for displaying an image, the system comprising:
a buffer adapted to receive image data for an image;
an image processing unit configured to define a set of multiple-pixel image sub-frames corresponding to the image data;
a display device adapted to display the sub-frames in a circularly-shifted manner at spatially offset sub-frame positions along a circle; and
wherein the image processing unit is configured to define the set of sub-frames based on a given plurality of spatially offset sub-frame positions, a first function that represents a simulated high resolution image that is based on the superimposition of circularly-shifted sub-frames, and a second function that represents a desired high resolution image.

13. The system of claim 12, wherein the display device is configured to display the sub-frames at different points in time.

14. The system of claim 12, wherein the sub-frames are shifted around the circle at a constant velocity.

15. The system of claim 12, wherein the set of sub-frames includes four sub-frames, and wherein a first one of the sub-frames is displayed at multiple positions along a first quadrant of the circle, a second one of the sub-frames is displayed at multiple positions along a second quadrant of the circle, a third one of the sub-frames is displayed at multiple positions along a third quadrant of the circle, and a fourth one of the sub-frames is displayed at multiple positions along a fourth quadrant of the circle.

16. The system of claim 12, wherein the buffer is adapted to receive a second set of image data for a second image, the image processing unit is configured to define a second set of sub-frames corresponding to the second set of image data, and the display device is adapted to display the sub-frames in the second set at the spatially offset sub-frame positions along the circle.

17. The system of claim 12, wherein the first function includes a matrix for defining distances between grid points of a pixel grid for the sub-frames.

18. The system of claim 12, wherein the second function includes a matrix for defining distances between grid points of a pixel grid for the desired high resolution image.

19. The system of claim 12, wherein the first function includes a pixel shape function for defining a shape of pixels of the sub-frames.

20. The system of claim 12, wherein the second function includes a pixel shape function for defining a shape of pixels of the desired high resolution image.

21. The system of claim 12, wherein the sub-frames are generated based on an integral equation that includes the first function and the second function.

22. The system of claim 21, wherein an integrand of the integral equation includes a difference between the first function and the second function.

23. A system for generating low resolution sub-frames for display at spatially offset positions to generate the appearance of a high resolution image, the system comprising:
  means for receiving high resolution images; and
  means for generating a plurality of low resolution sub-frames for each received high resolution image based on a given set of spatially offset sub-frame positions located on a circle, a first function that represents a simulated high resolution image that is based on the superimposition of circularly-shifted sub-frames, and a second function that represents the received high resolution image, wherein the generated sub-frames are configured to be displayed in a circularly-shifted manner at the set of spatially offset positions located on the circle to produce a representation of the received high resolution image.

24. The system of claim 23, wherein the first function includes a matrix for defining characteristics of a pixel grid for the sub-frames, and wherein the second function includes a matrix for defining characteristics of a pixel grid for the received high resolution images.

25. The system of claim 23, wherein the first function includes a pixel shape function for defining characteristics of pixels of the sub-frames, and wherein the second function includes a pixel shape function for defining characteristics of pixels of the received high resolution images.

26. The system of claim 23, wherein the sub-frames are generated based on an integral equation that includes the first function and the second function, and wherein an integrand of the integral equation includes a difference between the first function and the second function.

27. A computer-readable medium having computer-executable instructions for performing a method of generating low resolution sub-frames for display at spatially offset sub-frame positions to give the appearance of a high resolution image, comprising:
  receiving a high resolution image; and
  generating a plurality of low resolution sub-frames corresponding to the high resolution image based on a given set of spatially offset sub-frame positions located on a circle, a first function that represents a simulated high resolution image that is based on the superimposition of circularly-shifted sub-frames, and a second function that represents the received high resolution image, wherein the generated sub-frames are configured to be displayed in a circularly-shifted manner at the set of spatially offset sub-frame positions located on the circle to produce a representation of the received high resolution image.

28. The computer-readable medium of claim 27, wherein the first function includes a matrix for defining characteristics of a pixel grid for the sub-frames, and wherein the second function includes a matrix for defining characteristics of a pixel grid for the received high resolution image.

29. The computer-readable medium of claim 27, wherein the first function includes a pixel shape function for defining characteristics of pixels of the sub-frames, and wherein the second function includes a pixel shape function for defining characteristics of pixels of the received high resolution image.

30. The computer-readable medium of claim 27, wherein the sub-frames are generated based on an integral equation that includes the first function and the second function, and wherein an integrand of the integral equation includes a difference between the first function and the second function.

* * * * *

UNITED STATES PATENT AND TRADEMARK OFFICE
CERTIFICATE OF CORRECTION

PATENT NO. : 7,483,044 B2
APPLICATION NO. : 10/768215
DATED : January 27, 2009
INVENTOR(S) : Niranjan Damera-Venkata Page 1 of 1

It is certified that error appears in the above-identified patent and that said Letters Patent is hereby corrected as shown below:

In column 8, line 13, before "pixel" delete "frame".

In column 9, line 1, delete "r$^j$" and insert -- r$_j$ --, therefor.

In column 14, line 33, equation VIII, delete

" $$l_x^*[\bullet] = \underset{l_x[\bullet]}{\operatorname{argmin}} \int_u |\hat{h}(u; l_x) - h(u)|^2 du$$ "

and insert --
$$l^*_x[\cdot] = \underset{l_x[\cdot]}{\arg\min} \int_u |\hat{h}(\mathbf{u}; l_x) - h(\mathbf{u})|^2 d\mathbf{u}$$
--, therefor.

In column 14, line 37, delete "l$^*_x$" and insert -- $l^*_x$ --, therefor.

In column 18, line 3, equation XIV, delete

" $$l^*\Theta_{\{i\}}[\cdot] = \underset{l_{\Theta_{\{i\}}}[\cdot]}{\operatorname{argmin}} \int_u |\hat{h}(u; l_{\Theta_{\{i\}}}) - h(u)|^2 du$$ "

and insert --
$$l^*_{\Theta_{\{i\}}}[\cdot] = \underset{l_{\Theta_{\{i\}}}[\cdot]}{\arg\min} \int_\mathbf{u} |\hat{h}(\mathbf{u}; l_{\Theta_{\{i\}}}) - h(\mathbf{u})|^2 d\mathbf{u}$$
--, therefor.

Signed and Sealed this

Twelfth Day of May, 2009

JOHN DOLL
*Acting Director of the United States Patent and Trademark Office*